US012791407B2

(12) United States Patent
Kinjo

(10) Patent No.: US 12,791,407 B2
(45) Date of Patent: Nov. 10, 2026

(54) FLEXIBLE FORCE SENSOR WITH ROTATIONAL FORCE SENSITIVITY

(71) Applicant: Japan Display Inc., Tokyo (JP)

(72) Inventor: Hiroumi Kinjo, Tokyo (JP)

(73) Assignee: Japan Display Inc., Tokyo (JP)

(*) Notice: Subject to any disclaimer, the term of this patent is extended or adjusted under 35 U.S.C. 154(b) by 267 days.

(21) Appl. No.: 18/658,266

(22) Filed: May 8, 2024

(65) Prior Publication Data

US 2024/0377268 A1 Nov. 14, 2024

(30) Foreign Application Priority Data

May 9, 2023 (JP) ................................ 2023-077428

(51) Int. Cl.
*G01L 1/22* (2006.01)

(52) U.S. Cl.
CPC .................................. *G01L 1/2287* (2013.01)

(58) Field of Classification Search
CPC .................................................... G01L 1/2287
USPC ............................................................ 73/774
See application file for complete search history.

(56) References Cited

U.S. PATENT DOCUMENTS

| | | | | |
|---|---|---|---|---|
| 11,976,988 B2 * | 5/2024 | Nohno | ...................... | G01L 1/18 |
| 2015/0277626 A1 * | 10/2015 | Shinkai | ................. | G06F 3/0447 345/174 |
| 2021/0190607 A1 * | 6/2021 | Kinjo | .................... | G01L 1/2293 |
| 2021/0285831 A1 * | 9/2021 | Hotta | ...................... | G01L 5/165 |
| 2026/0002825 A1 * | 1/2026 | Zimmermann | ........... | G01L 1/20 |

FOREIGN PATENT DOCUMENTS

| | | | | |
|---|---|---|---|---|
| CN | 114222904 A | * 3/2022 | ............. | G01L 1/148 |
| JP | 2006250705 A | * 9/2006 | | |
| JP | 2013096846 A | * 5/2013 | | |
| JP | 2013117458 A | * 6/2013 | | |
| JP | 2018194529 A | * 12/2018 | | |
| JP | 2018200281 A | * 12/2018 | ......... | G06F 3/04144 |

OTHER PUBLICATIONS

Translation 2018194529 (Year: 2018).*
Translation_Sugawara JP2006250705 (Year: 2006).*
Translation_Hiraki JP2018200281 (Year: 2018).*

* cited by examiner

*Primary Examiner* — Peter J Macchiarolo
*Assistant Examiner* — Monica S Young
(74) *Attorney, Agent, or Firm* — K&L Gates LLP

(57) ABSTRACT

A load detection device includes a force detector, an elastic deformation part, and an input unit disposed in order in a first direction. The force detector includes an array substrate provided with a plurality of array electrodes on a first surface, the first surface facing the first direction, and a sensor layer facing the array electrodes.

3 Claims, 15 Drawing Sheets

FLEXIBLE FORCE SENSOR WITH ROTATIONAL FORCE SENSITIVITY

CROSS-REFERENCE TO RELATED APPLICATION

This application claims the benefit of priority from Japanese Patent Application No. 2023-077428 filed on May 9, 2023, the entire contents of which are incorporated herein by reference.

BACKGROUND

1. Technical Field

The present disclosure relates to a load detection device.

2. Description of the Related Art

Load detection devices are devices that detect a load (force) perpendicularly applied to a detection surface and a load applied in a direction parallel to the detection surface. The direction parallel to the detection surface is hereinafter referred to as a horizontal direction. The load detection device according to Japanese Patent Application Laid-open Publication No. 2018-200281 includes a force detector that detects force and an elastic deformation part stacked on the force detector. The force detector includes an array substrate provided with a plurality of array electrodes and a sensor layer facing the array electrodes. The elastic deformation part includes a plurality of protrusions (bumps). One protrusion is disposed over a plurality of array electrodes. The bottom surface of the protrusion is fixed to the force detector, and a load is applied to the top end of the protrusion.

In the load detection device, an input surface to which the load is applied is composed of a plurality of protrusions and has recesses and protrusions. If the number of recesses and protrusions is large, foreign matter or the like is likely to enter the space between the protrusions, which is undesirable. To address this, it is conceivable to increase the size of the protrusions and reduce the number of recesses and protrusions. If the size of the protrusions is increased, however, they are hard to be subjected to shear deformation when a load in the horizontal direction is applied thereto, resulting in reduced detection sensitivity. In addition, it is desired that the load detection device be able to detect not only force and horizontal loads but also rotational loads (loads in the rotational direction around an axis perpendicular to the input surface).

SUMMARY

An object of the present disclosure is to provide a load detection device that has a smaller number of recesses and protrusions on an input surface and can detect a rotational load while securing easiness of the shear deformation of the protrusions.

A load detection device according to an embodiment of the present disclosure includes a force detector, an elastic deformation part, and an input unit disposed in order in a first direction. The force detector includes an array substrate provided with a plurality of array electrodes on a first surface, the first surface facing the first direction, and a sensor layer facing the array electrodes, the array electrodes are arrayed in a second direction intersecting the first direction and in a third direction intersecting both the first direction and the second direction, the elastic deformation part includes a plurality of first protrusions arrayed in the second direction and the third direction, the first protrusions are each disposed to overlap, when viewed from the first direction, at least two or more of the array electrodes arrayed in the second direction and at least two or more of the array electrodes arrayed in the third direction, the input unit includes a plurality of second protrusions arrayed in the second direction and the third direction, and the second protrusions are each disposed to overlap, when viewed from the first direction, at least two or more of the first protrusions arrayed in the second direction and at least two or more of the first protrusions arrayed in the third direction.

DETAILED DESCRIPTION

Figure 1:
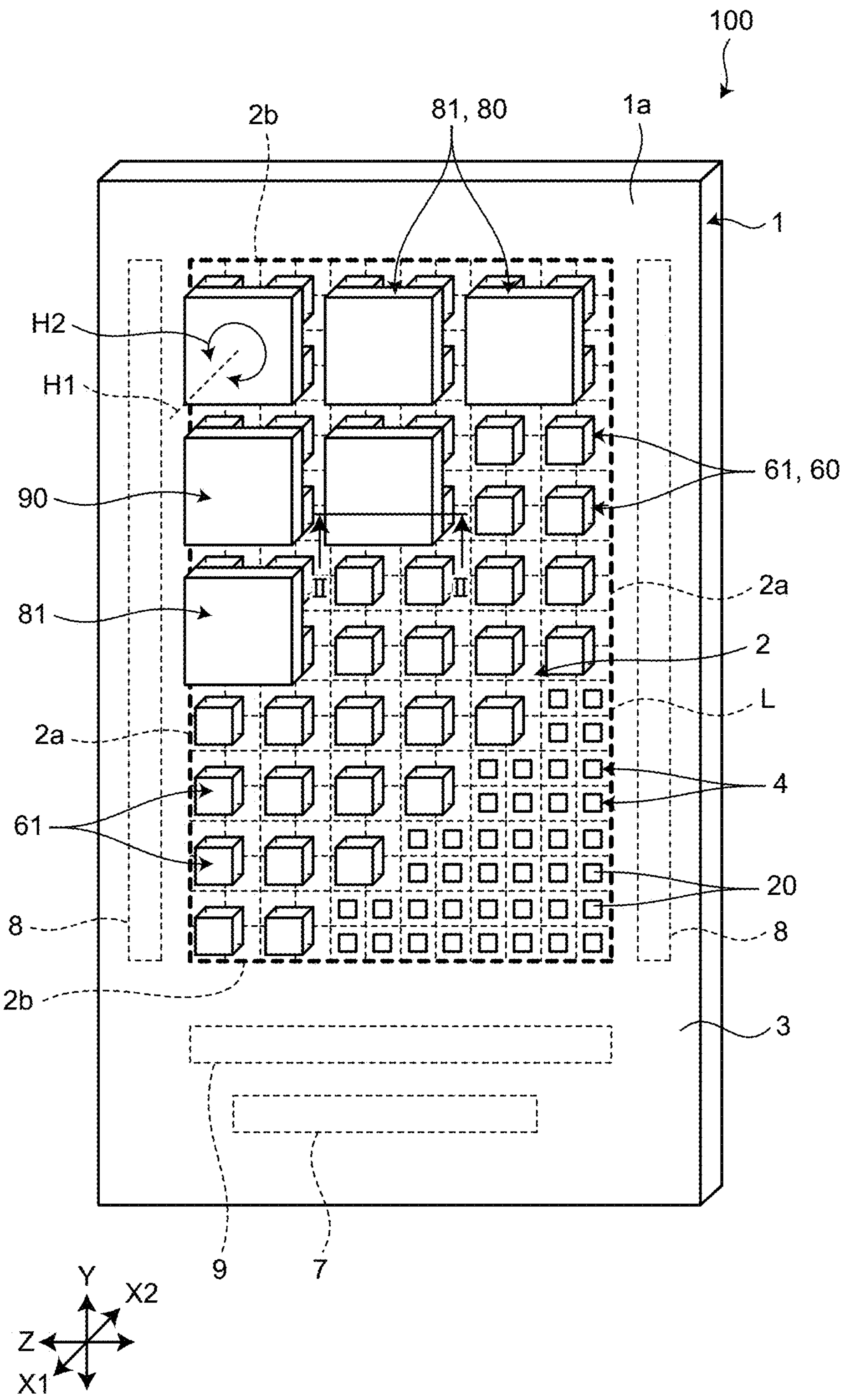
FIG. 1 is a perspective view schematically illustrating a load detection device according to a first embodiment.

Exemplary aspects (embodiments) to embody a load detection device according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present disclosure and easily conceivable by those skilled in the art naturally fall within the scope of the present disclosure. To simplify the explanation, the drawings may possibly illustrate the width, the thickness, the shape, and other elements of each unit more schematically than those in the actual aspect. These elements, however, are given by way of example only and are not intended to limit interpretation of the present disclosure. In the present specification and the drawings, components similar to those previously described with reference to previous drawings are denoted by like reference numerals, and detailed explanation thereof may be appropriately omitted.

To describe an aspect regarding a certain structure on which another structure is disposed in the present specification and the claims, when "on" is simply used, it indicates both the following cases unless otherwise noted: a case where the other structure is disposed directly on and in contact with the certain structure, and a case where the other structure is disposed on the certain structure with yet another structure interposed therebetween.

First Embodiment

FIG. 1 is a perspective view schematically illustrating a load detection device according to a first embodiment. As illustrated in FIG. 1, a load detection device 100 includes a force detector 1, an elastic deformation part 60, and an input unit 80. The elastic deformation part 60 is disposed on one surface (detection surface 1*a*) of the force detector 1. The input unit 80 is disposed opposite to the force detector 1 with respect to the elastic deformation part 60.

In the following description, the direction in which the force detector 1, the elastic deformation part 60, and the input unit 80 are disposed is referred to as a stacking direction. In the stacking direction, the direction in which the input unit 80 is disposed with respect to the force detector 1 is referred to as a first direction X1. The direction opposite to the first direction X1 is referred to as a force direction X2. The view from the force direction X2 is referred to plan view. The direction parallel to one surface (detection surface 1*a*) of the force detector 1 is referred to as a horizontal direction.

The load detection device 100 detects a load (force) in the force direction X2, a load in the horizontal direction, and a load in a rotational direction (refer to arrow H2 in FIG. 1). The load in the rotational direction is a load H2 in the rotational direction around a virtual line H1 extending in the stacking direction as illustrated in FIG. 1. The surface of the load detection device 100 positioned in the first direction X1 is an input surface 90 to which the load is applied. Thus, the input surface 90 is composed of the input unit 80.

The force detector 1 is a flat plate device having a small thickness in the stacking direction and extending in the horizontal direction. The force detector 1 has the detection surface 1*a* facing the first direction X1. The detection surface 1*a* of the force detector 1 is divided into a detection region 2 and a peripheral region 3. The detection region 2 is a region positioned at the center of the detection surface 1*a* and in which force can be detected. The peripheral region 3 surrounds the outer periphery of the detection region 2.

The detection region 2 has a rectangular shape in plan view. Therefore, an outer frame L of the detection region 2 has a pair of long sides 2*a* and a pair of short sides 2*b*. The direction parallel to the long sides 2*a* is hereafter referred to as a second direction Y. The direction parallel to the short sides 2*b* is referred to as a third direction Z. The detection region 2 is divided into a plurality of sections in the second direction Y and the third direction Z. The divided regions are referred to as individual detection regions 4.

Figure 2:
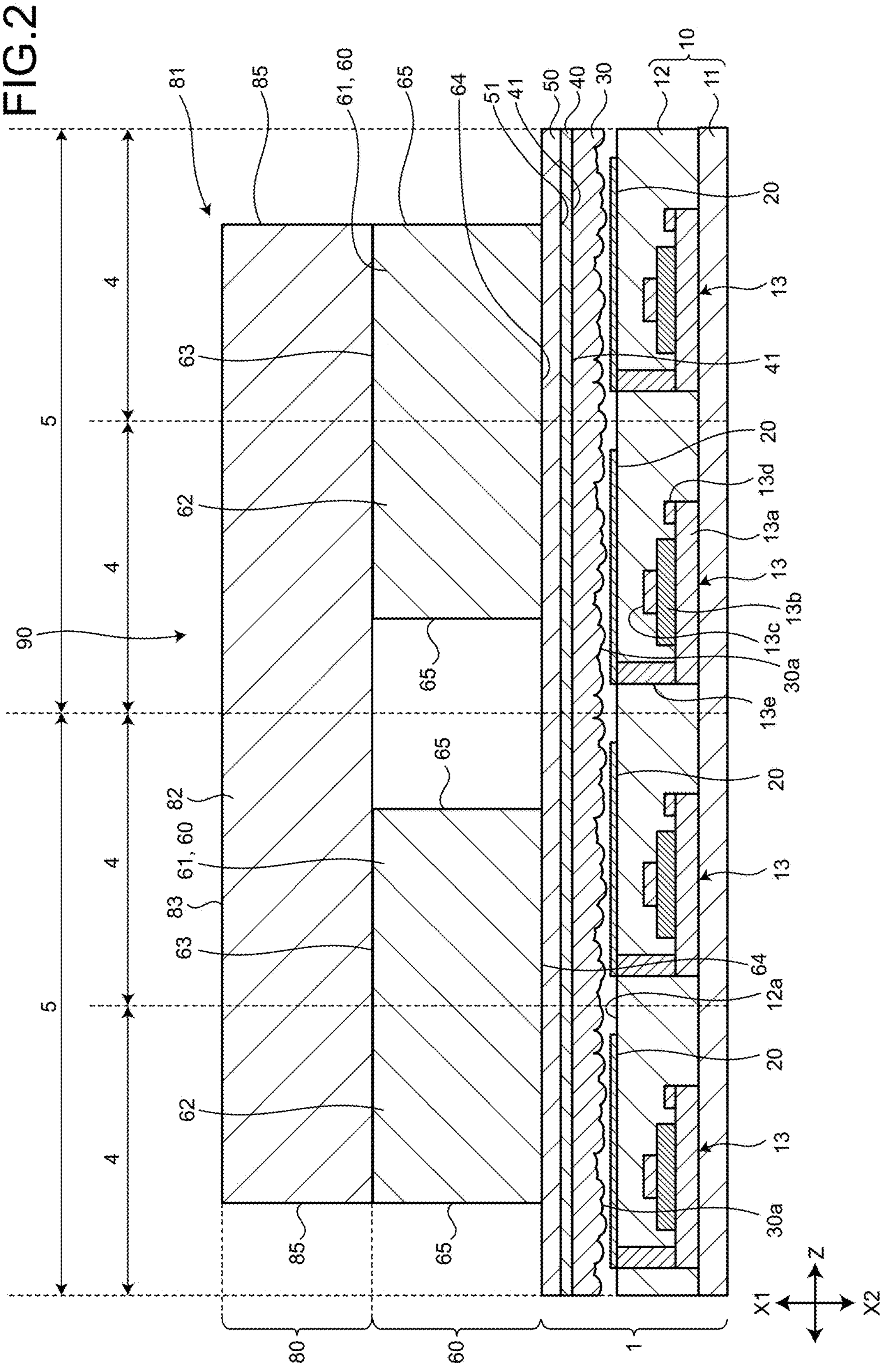
FIG. 2 is a sectional view taken along line II-II of FIG. 1 and viewed from the arrow direction.

FIG. 2 is a sectional view taken along line II-II of FIG. 1 and viewed from the arrow direction. As illustrated in FIG. 2, the force detector 1 includes an array substrate 10, a sensor layer 30, a common electrode 40, and a protective layer 50 disposed in order in the first direction X1. The array substrate 10 includes a substrate 11 and an array layer 12 disposed in order in the first direction X1.

The substrate 11 is an insulating substrate serving as a base material of the array layer 12. The substrate 11 is made of material hard to deform if a load is applied to the force detector 1. Examples of the substrate 11 include, but are not limited to, a glass substrate, a resin substrate, etc.

The array layer 12 is stacked on and integrated with the substrate 11. The array layer 12 includes a plurality of insulating layers, which are not specifically illustrated, stacked in the stacking direction. A plurality of drive transistors (switch elements) 13 are provided inside the array layer 12. The drive transistor 13 includes a semiconductor layer 13*a*, a gate insulating film 13*b*, a gate electrode 13*c*, a drain electrode 13*d*, and a source electrode 13*e*. The drive transistors 13 are disposed in the detection region 2. The drive transistors 13 are provided to the respective individual detection regions 4. Therefore, the drive transistors 13 are arrayed in the second direction Y and the third direction Z corresponding to the respective individual detection regions 4.

The array layer 12 has a first surface 12*a* facing the first direction X1. The first surface 12*a* is provided with a plurality of array electrodes 20. The array electrode 20 is made of metal material, such as indium tin oxide (ITO). The array electrode 20 has a rectangular shape in plan view (refer to FIG. 4). The array electrodes 20 are disposed in the detection region 2. The array electrodes 20 are provided to the respective individual detection regions 4. Therefore, the array electrodes 20 are arrayed in the second direction Y and the third direction Z corresponding to the respective individual detection regions 4 (refer to FIG. 1). The array electrode 20 is positioned at the center of the individual detection region 4 in plan view (refer to FIG. 4). The array electrode 20 is coupled to the source electrode 13*e* of the drive transistor 13.

The array layer 12 includes various components for driving the drive transistors 13. Specifically, the array layer 12 includes a coupler 7 (refer to FIG. 1), a gate line drive circuit 8 (refer to FIG. 1), a signal line selection circuit 9 (refer to FIG. 1), gate lines 14 (refer to FIG. 3), and signal lines 15 (refer to FIG. 3).

As illustrated in FIG. 1, the coupler 7, the gate line drive circuit 8, and the signal line selection circuit 9 are disposed in the peripheral region 3. The coupler 7 couples the force detector 1 to a drive integrated circuit (IC) disposed outside the force detector 1. The drive IC according to the present disclosure may be mounted as a chip on film (COF) on a flexible printed circuit board or a rigid circuit board coupled to the coupler 7. Alternatively, the drive IC may be mounted as a chip on glass (COG) in the peripheral region 3.

The gate line drive circuit 8 is a circuit that drives the gate lines 14 (refer to FIG. 3) based on various control signals from the drive IC. The gate line drive circuit 8 sequentially or simultaneously selects the gate lines 14 and supplies gate drive signals to the selected gate lines 14. The signal line selection circuit 9 is a switch circuit that sequentially or simultaneously selects the signal lines 15 (refer to FIG. 3). The signal line selection circuit 9 is a multiplexer, for example. The signal line selection circuit 9 couples the selected signal lines 15 to the drive IC based on selection signal supplied from the drive IC.

Figure 3:
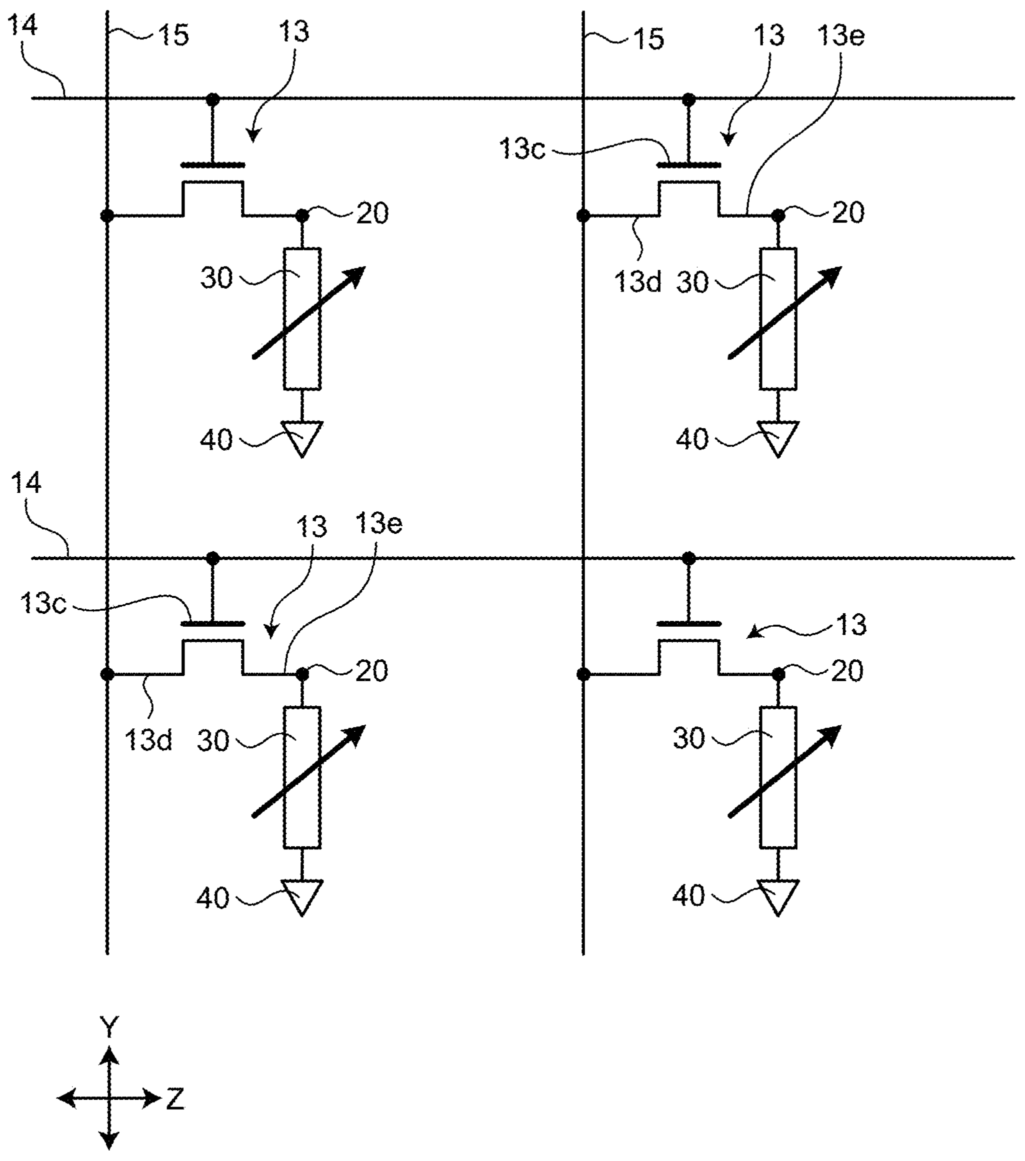
FIG. 3 is a circuit diagram of a circuit configuration of a force sensor according to the first embodiment.

FIG. 3 is a circuit diagram of a circuit configuration of a force sensor according to the first embodiment. As illustrated in FIG. 3, the gate line 14 is coupled to the gate line drive circuit 8 at one end and extends in the third direction Z in the detection region 2. A plurality of gate lines 14 are arrayed in the second direction Y in the detection region 2. The signal line 15 is coupled to the signal line selection circuit 9 at one end and extends in the second direction Y in the detection region 2. A plurality of signal lines 15 are arrayed in the third direction Z in the detection region 2.

The gate line 14 is coupled to the gate electrode 13*c* of the drive transistor 13. The signal line 15 is coupled to the drain electrode 13*d* of the drive transistor 13. When the gate line 14 is scanned, the drive transistor 13 is closed. As a result, an electrical signal (current value) input to the array electrode 20 is output to the signal line 15 via the drive transistor 13. The electrical signal (current value) is transmitted from the signal line 15 to the drive IC.

The array layer 12 also includes common wiring, which is not specifically illustrated, extending along the peripheral region 3. The common wiring is wiring for supplying a current to the common electrode 40. The common wiring is coupled to the drive IC via the coupler 7 and is supplied with a certain amount of electric current from the drive IC.

As illustrated in FIG. 2, the protective layer 50 is an insulating layer extending in the horizontal direction. The peripheral region 3 on the first surface 12*a* of the array substrate 10 is provided with a frame-shaped spacer, which is not illustrated. The protective layer 50 is supported by the spacer, which is not illustrated. As a result, the protective layer 50 is spaced apart from the array substrate 10 in the first direction X1. The protective layer 50 has the detection surface 1*a* facing the first direction X1 and a facing surface 51 facing the force direction X2 and the array electrode 20.

The common electrode 40 is made of metal material, such as indium tin oxide (ITO). The common electrode 40 is a solid film deposited on the facing surface 51 of the protective layer 50 and is provided in the entire detection region 2. The common electrode 40 is coupled to the common wiring (not illustrated) by wiring, which is not illustrated. Therefore, the common electrode 40 is supplied with a certain amount of current from the drive IC.

The sensor layer 30 is provided on a surface 41 facing the force direction X2 of the common electrode 40. The sensor layer 30 is provided in the entire detection region 2. The sensor layer 30 is made of conductive resin. The sensor layer 30 is provided with a plurality of protrusions 30*a* on the surface facing the force direction X2. Each protrusion 30*a* is spaced apart from the array electrode 20 and the first surface 12*a* of the array layer 12. Therefore, a gap is formed between the sensor layer 30, and the array electrode 20 and the first surface 12*a*.

The elastic deformation part 60 is made of elastically deformable material. Therefore, the elastic deformation part 60 deforms when a load is applied thereto and returns to its original shape when the load is removed. While examples of the typical material of the elastic deformation part 60 include, but are not limited to, rubber, resin, etc., the present disclosure is not limited to these materials.

As illustrated in FIG. 1, the elastic deformation part 60 according to the first embodiment includes a plurality of first protrusions 61. The first protrusion 61 has a quadrangular prism shape. The first protrusions 61 are arrayed in the second direction Y and the third direction Z. FIG. 1 does not illustrate some of the first protrusions 61 to make the inside of the detection region 2 easy to see.

The elastic deformation part 60 according to the present embodiment is composed only of a plurality of first protrusions 61. In other words, the first protrusions 61 are independent of each other. As illustrated in FIG. 2, the end of the first protrusion 61 in the first direction X1 is a top end 62. The first protrusion 61 has a top end surface 63 facing the first direction X1, a bottom surface 64 facing the force direction X2, and four side surfaces 65.

The bottom surface 64 is fixed to the detection surface 1*a* of the force detector 1. While examples of the fixing method include, but are not limited to, adhesion, welding, etc., the present disclosure is not limited to these methods. Two of the four side surfaces 65 face the second direction Y and the other two face the third direction Z. Therefore, two first protrusions 61 disposed side by side in the second direction Y or the third direction Z are arranged with the side surfaces 65 facing each other.

As illustrated in FIG. 1, each first protrusion 61 is spaced apart from the other protrusions 61 disposed in the second direction Y and the third direction Z. The sectional shape of the first protrusion 61 taken along the stacking direction is rectangular. While the sectional shape in the stacking direction of the first protrusion 61 according to the present embodiment is rectangular, the present disclosure is not limited thereto, and the sectional shape may be trapezoidal, for example.

Figure 4:
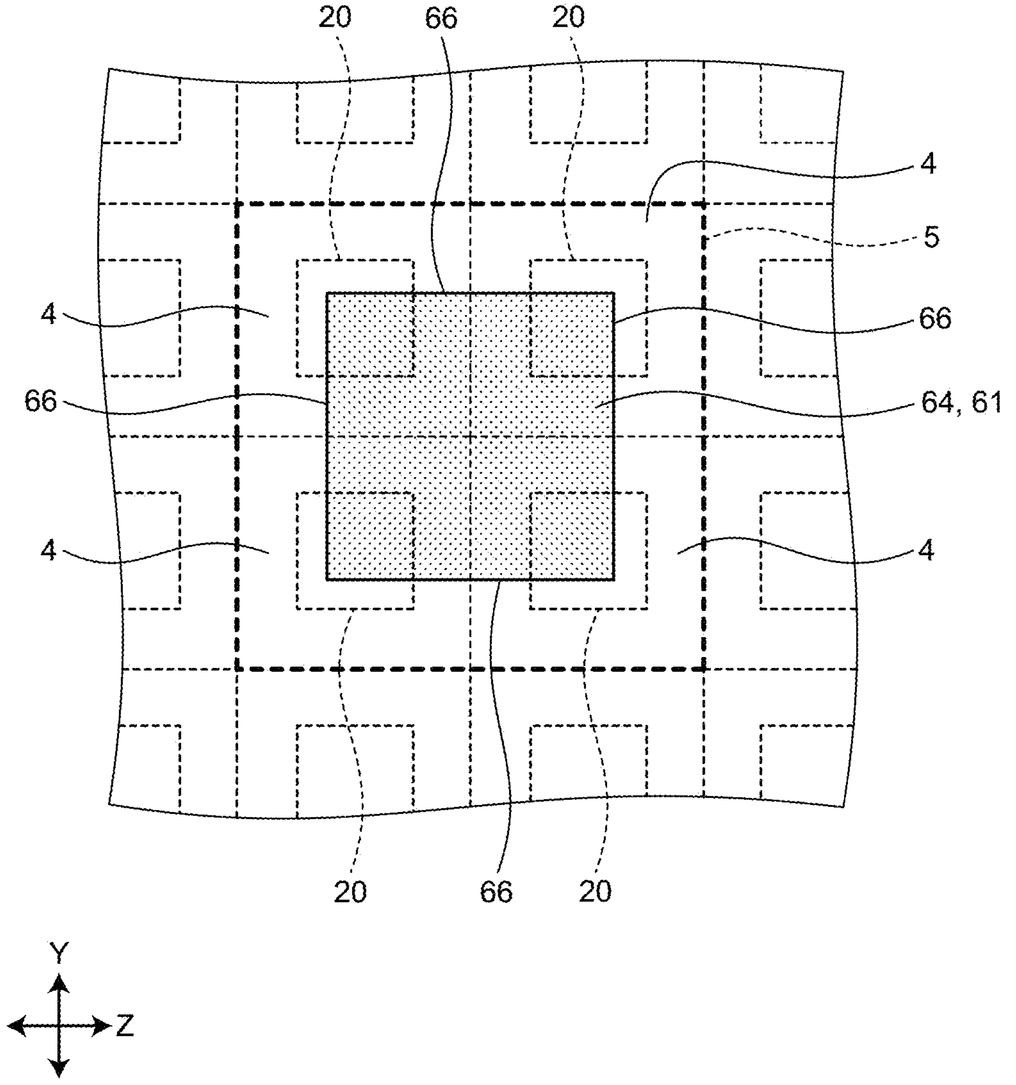
FIG. 4 is a schematic of the correspondence between a protrusion and individual detection regions according to the first embodiment.

FIG. 4 is a schematic of the correspondence between the protrusion and the individual detection regions according to the first embodiment. As illustrated in FIG. 4, the first protrusion 61 is disposed over a plurality of individual detection regions 4 in plan view. Therefore, when a load is applied to one first protrusion 61, it acts on (is transmitted to) four individual detection regions 4. In the following description, the four individual detection regions 4 are collectively referred to as a load detection region 5. The bottom surface 64 has four sides 66. Each side 66 overlaps the array electrodes 20 in plan view.

Figure 5:
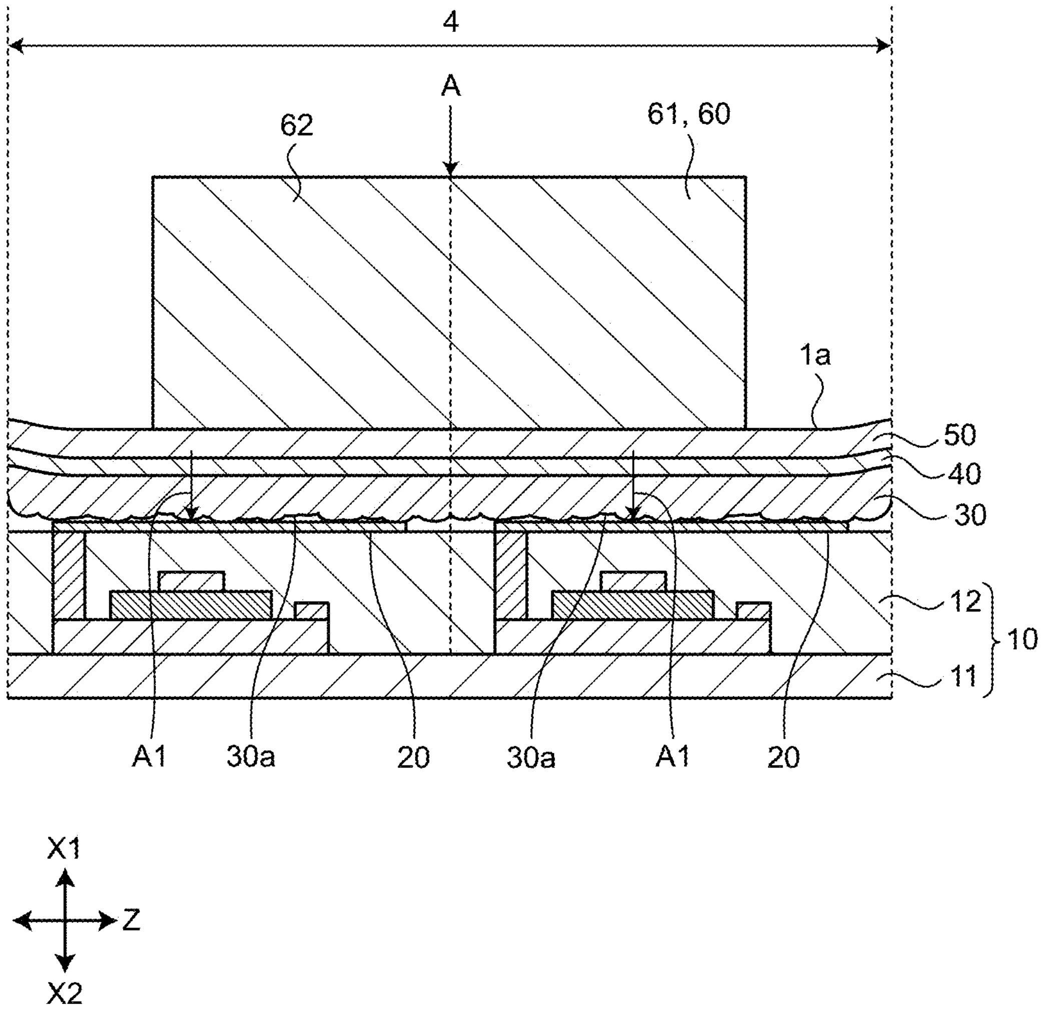
FIG. 5 is a sectional view of a state where a load in a force direction is applied to a first protrusion according to the first embodiment.

FIG. 5 is a sectional view of a state where a load in the force direction is applied to the first protrusion according to the first embodiment. FIG. 5 does not illustrate a second protrusion 81. With the structure described above, when force A (load in the force direction X2) is applied to the top end surface 63 of the first protrusion 61, the first protrusion 61 moves in the force direction X2 as illustrated in FIG. 5. The load is transmitted from the first protrusion 61 to the common electrode 40 and the sensor layer 30, and the common electrode 40 and the sensor layer 30 also move in the force direction X2. The protrusions 30*a* of the sensor layer 30 come into contact with the array electrode 20.

As a result, the array electrode 20 is electrically coupled to the common electrode 40, and a current flows from the common electrode 40 to the array electrode 20 (refer to arrow A1 in FIG. 5). The current flowing to the array electrode 20 is transmitted to the drive IC via the signal line 15. The drive IC receives a detection signal (current) and detects that the load is applied to the individual detection region 4.

When the force A applied to the first protrusion 61 is large, the number of protrusions 30*a* in contact with the array electrode 20 increases, and the contact area with the array electrode 20 increases. In addition, the protrusions 30*a* are pressed against and planarized on the array electrode 20, thereby increasing the contact area with the array electrode 20. For this reason, the amount of current input to the array electrode 20 increases in proportion to an increase in the force A (increase in the contact area). The drive IC detects the magnitude of the load acting on the individual detection region 4 from the magnitude of the received current value.

If the load acting on the first protrusion 61 is force (load in the force direction X2), the force acting on the first protrusion 61 is evenly distributed to the four individual detection regions 4. In other words, the loads (current values) detected in the respective four individual detection regions 4 included in the load detection region 5 are equal. Therefore, if the amounts of current detected from the respective four individual detection regions 4 included in the load detection region 5 are equal, the drive IC determines that the direction of the load acting on the first protrusion 61 is the force direction X2.

Figure 6:
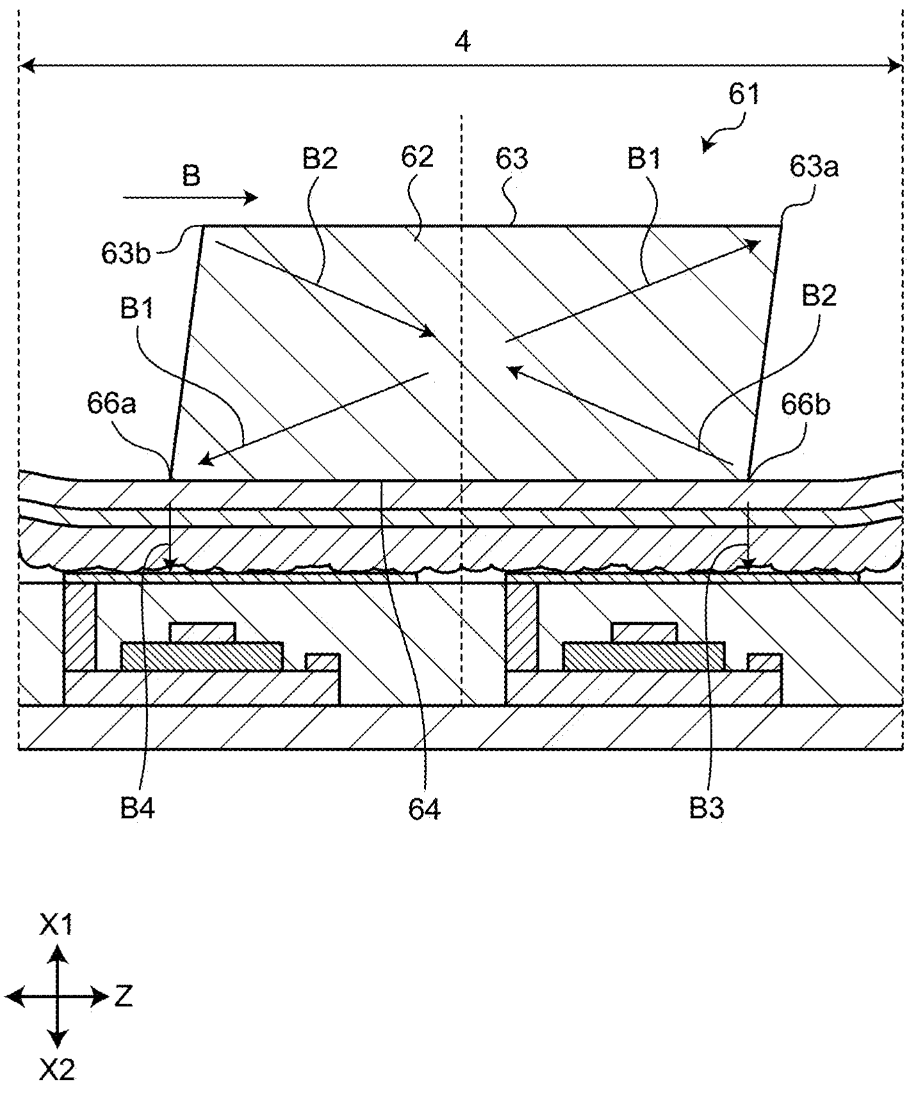
FIG. 6 is a sectional view of a state where a load in a horizontal direction is applied to the protrusion according to the first embodiment.

FIG. 6 is a sectional view of a state where a load in the horizontal direction is applied to the protrusion according to the first embodiment. FIG. 6 does not illustrate the second protrusion 81 either. The following describes a case where a load in the horizontal direction (refer to arrow B in FIG. 6) is applied to the first protrusion 61. The load in the horizontal direction described herein is a load in the third direction Z (hereinafter referred to as a horizontal load B).

The horizontal load B includes a load component in the force direction X2. Therefore, a load in the force direction X2 acts on the detection surface 1*a* from the bottom surface 64 of the first protrusion 61. As a result, the sensor layer 30 belonging to the four individual detection regions 4 comes into contact with the array electrodes 20, and a current flows from the common electrode 40 to the array electrodes 20. For this reason, the loads in the force direction X2 are detected from the respective individual detection regions 4 when the horizontal load B is applied to the first protrusion 61.

As illustrated in FIG. 6, when the horizontal load B is applied to the top end 62 of the first protrusion 61, the top end 62 of the first protrusion 61 moves in the direction of the load (third direction Z). By contrast, the bottom surface 64 of the first protrusion 61 is fixed, and the first protrusion 61 does not move. Therefore, the first protrusion 61 is subjected to shear deformation, and the sectional shape of the first protrusion 61 becomes a parallelogram.

When the sectional shape of the first protrusion 61 becomes a parallelogram, shear stress is generated in the first protrusion 61. As a result, extensional stress (arrow B1) extending on a diagonal line acts between the side (side 63*a* in FIG. 6) positioned in the direction of the horizontal load B out of the four sides of the top end surface 63 and the side (refer to a side 66*a* in FIG. 6) positioned in the opposite direction of the horizontal load B out of the four sides 66 of the bottom surface 64. This reduces the load in the force direction X2 acting on the detection surface 1*a* from the bottom surface 64 near the side (refer to the side 66*a* in FIG. 6) of the bottom surface 64 positioned in the opposite direction of the horizontal load B.

Compressive stress (arrow B2) compressing on a diagonal line acts between the side (side 63*b* in FIG. 6) positioned in the opposite direction of the horizontal load B out of the four sides of the top end surface 63 and the side (side 66*b* in FIG. 6) positioned in the direction of the horizontal load B out of the four sides 66 of the bottom surface 64. This increases the load in the force direction X2 acting on the detection surface 1*a* from the bottom surface 64 near the side (refer to the side 66*b* in FIG. 6) of the bottom surface 64 positioned in the direction of the horizontal load B.

For this reason, the load in the force direction X2 acting on the detection surface 1*a* from the bottom surface 64 varies in the bottom surface 64. The load becomes larger as the portion is positioned in the direction of the horizontal load B and smaller as the portion is positioned in the opposite direction of the horizontal load B. As described above, a bias occurs in the load in the force direction X2 acting on the detection surface 1*a* from the bottom surface 64 of the first protrusion 61.

Therefore, when the horizontal load B is applied, the contact area between the sensor layer 30 and the array electrode 20 is larger in the individual detection region 4 to which the side 66*b* belongs than in the individual detection region 4 to which the side 66*a* belongs. As a result, the amount of current input to the array electrode 20 in the individual detection region 4 to which the side 66*b* belongs (refer to arrow B3 in FIG. 6) is larger than the amount of current input to the array electrode 20 in the individual detection region 4 to which the side 66*a* belongs (refer to arrow B4 in FIG. 6).

Therefore, if the drive IC determines that the amounts of current detected from the respective four individual detection regions 4 included in the load detection region 5 are not equal, it determines that the direction of the load applied to the first protrusion 61 is the horizontal direction. The drive IC identifies the direction in which the individual detection region 4 with the larger detected amount of current is positioned with respect to the individual detection region 4 with the smaller detected amount of current out of the four individual detection regions 4 as the direction of the horizontal load B.

As the horizontal load B increases, the bias in the load in the force direction X2 acting on the detection surface 1*a* from the bottom surface 64 increases. Therefore, the drive IC calculates the difference (bias) in the amounts of current detected from the respective individual detection regions 4 to calculate the magnitude of the horizontal load B.

In addition, if the load applied to the first protrusion 61 is a load in the horizontal direction, the force load acting on the detection surface 1*a* from the bottom surface 64 of the first protrusion 61 more significantly varies as closer to the four sides 66 of the bottom surface 64. In other words, the bias in the load due to the shear stress is larger as closer to the four sides 66 of the bottom surface 64. The present embodiment has high sensitivity to detect the load in the horizontal direction because the four sides 66 of the bottom surface 64 overlap the array electrodes 20 (refer to FIG. 4). The following describes the input unit 80.

As illustrated in FIG. 1, the input unit 80 includes a plurality of second protrusions 81. The second protrusion 81 has a quadrangular prism shape. Therefore, the sectional shape of the second protrusion 81 taken along the stacking direction is rectangular. The second protrusions 81 are arrayed in the second direction Y and the third direction Z. FIG. 1 does not illustrate some of the second protrusions 81 to make the inside of the detection region 2 easy to see.

The input unit 80 according to the present embodiment is composed only of a plurality of second protrusions 81. In other words, the second protrusions 81 are independent of each other. As illustrated in FIG. 2, the end of the second protrusion 81 in the first direction X1 is a top end 82. A load is applied to the top end 82. The second protrusion 81 has a top end surface 83 facing the first direction X1, a bottom surface 84 facing the force direction X2, and four side surfaces 85. The top end surface 83 and the bottom surface 84 each have a square (quadrilateral) shape. The top end surfaces 83 of the second protrusions 81 constitute the input surface 90. The bottom surface 84 is fixed to the top end surfaces 63 of the first protrusions 61. While examples of the fixing method include, but are not limited to, adhesion, welding, etc., the present disclosure is not limited to these methods.

As illustrated in FIG. 1, two of the four side surfaces 85 face the second direction Y, and the other two face the third direction Z. Therefore, two second protrusions 81 disposed side by side in the second direction Y or the third direction Z are arranged with the side surfaces 85 facing each other. Each second protrusion 81 is spaced apart from the other protrusions 81 disposed in the second direction Y and the third direction Z. Therefore, when a load in the horizontal direction is applied to the second protrusion 81, the second protrusion is less likely to come into contact with another second protrusion 81.

Figure 7:
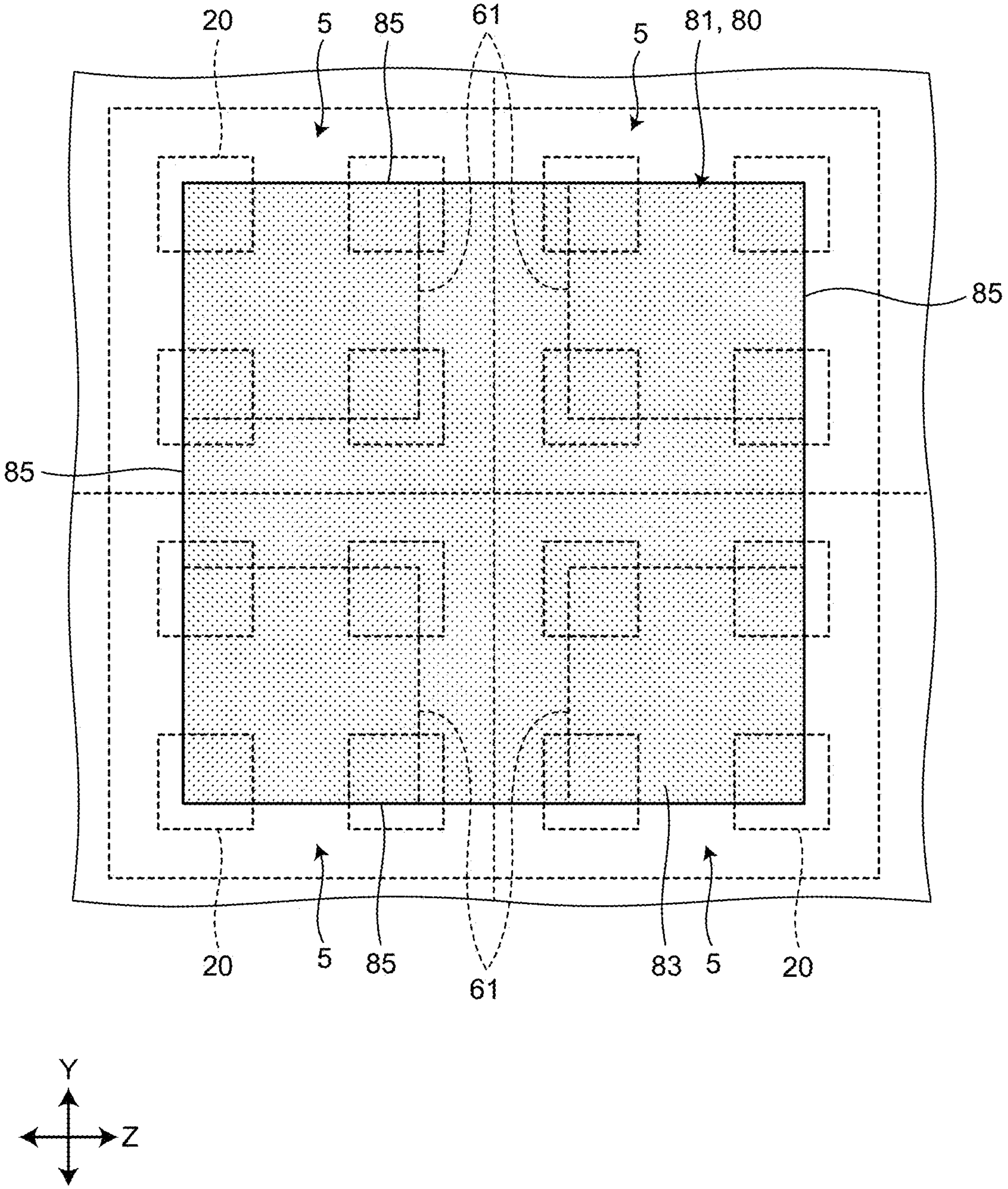
FIG. 7 is a schematic of the correspondence between a second protrusion and the first protrusions according to the first embodiment.

FIG. 7 is a schematic of the correspondence between the second protrusion and the first protrusions according to the first embodiment. As illustrated in FIG. 7, the second protrusion 81 is disposed over a plurality of load detection regions 5 in plan view. Therefore, when a load is applied to one second protrusion 81, it acts on (is transmitted to) four first protrusions 61 disposed in the respective four load detection regions 5.

The input unit 80 is made of material hard to elastically deform. More preferably, the input unit 80 is made of material more rigid than the first protrusion. This configuration prevents the load transmitted to the first protrusion 61 from being reduced due to deformation of the input unit 80 by the load.

The following describes an exemplary operation of the load detection device according to the first embodiment. If the load acting on the second protrusion 81 is force (load in the force direction X2), the load is equally transmitted from the second protrusion 81 to the four first protrusions 61 coupled to the second protrusion 81. Therefore, force is detected in each of the four load detection regions 5.

Figure 8:
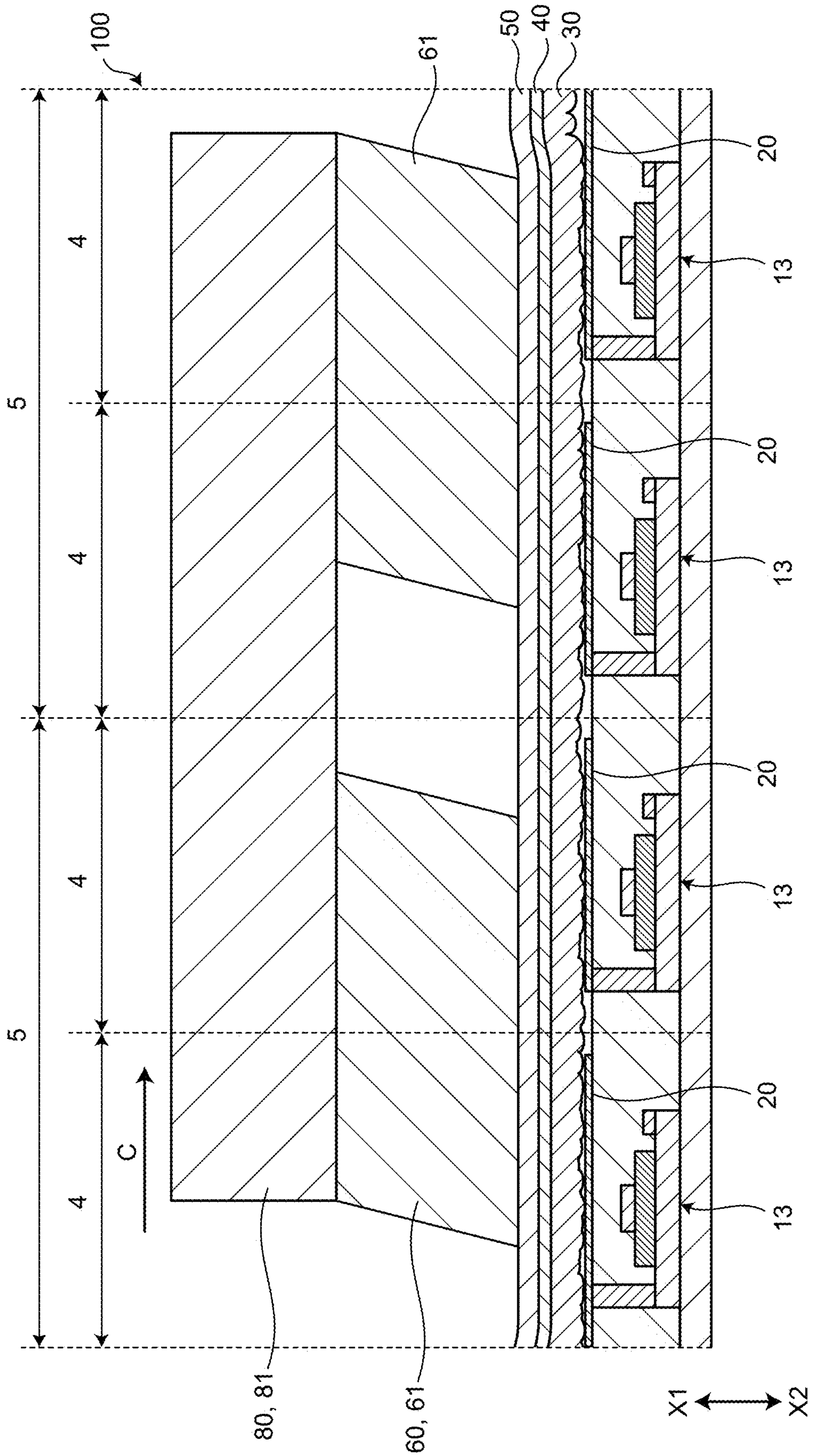
FIG. 8 is a schematic sectional view of a state where a horizontal load is applied to the second protrusion according to the first embodiment.

FIG. 8 is a schematic sectional view of a state where a horizontal load is applied to the second protrusion according to the first embodiment. As illustrated in FIG. 8, if the load acting on the second protrusion 81 is a horizontal load C, the second protrusion 81 moves in the direction of the horizontal load C. The second protrusion 81 has high rigidity and is not subjected to shear deformation. The top ends 62 of the respective four first protrusions 61 coupled to the second protrusion 81 move in the direction of the horizontal load C. As a result, each of the four first protrusions 61 is subjected to shear deformation, and the horizontal load C is detected in each of the four load detection regions 5.

Figure 9:
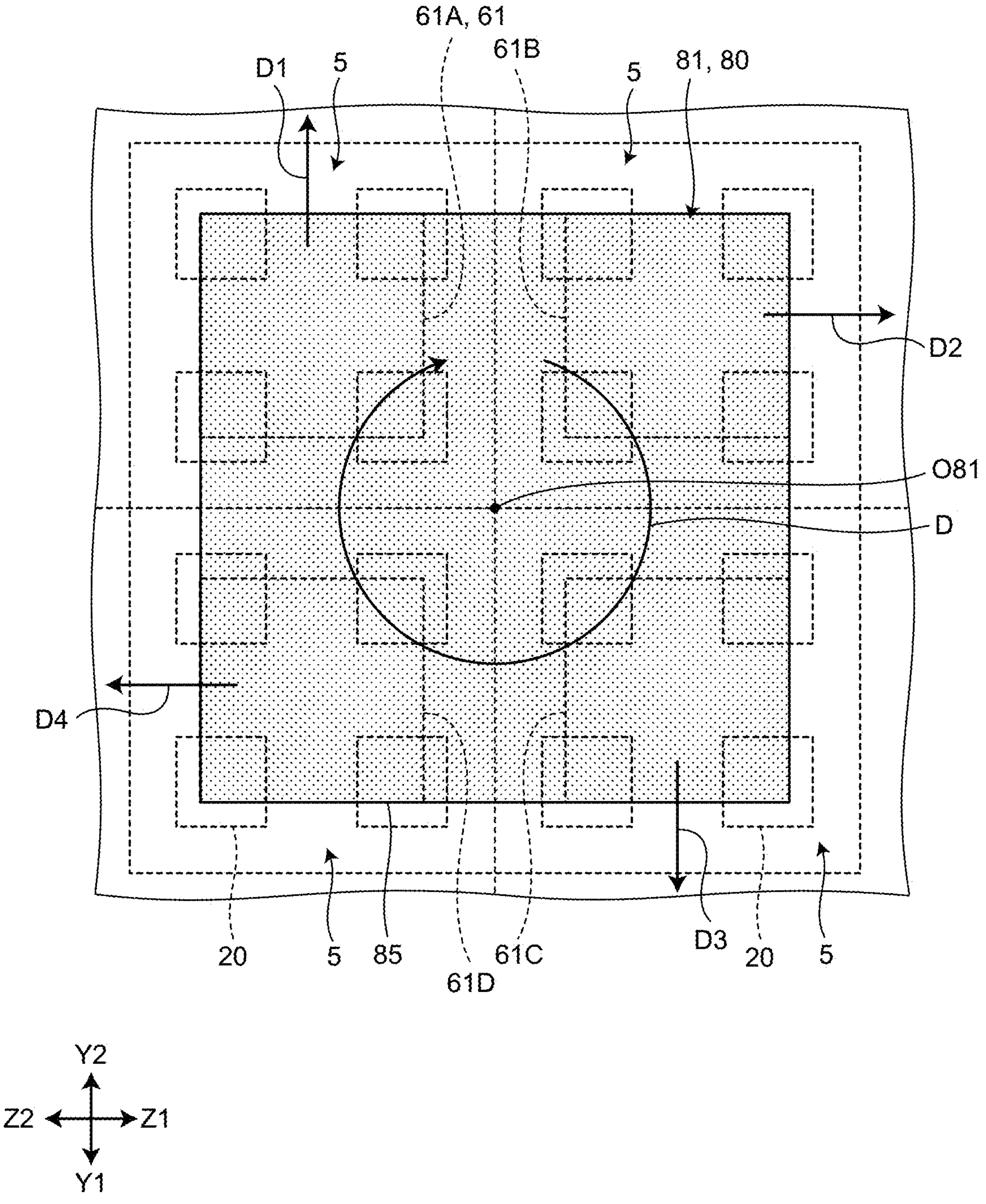
FIG. 9 is a schematic plan view of a state where a rotational load is applied to the second protrusion according to the first embodiment.

FIG. 9 is a schematic plan view of a state where a rotational load is applied to the second protrusion according to the first embodiment. The following describes a case where the load acting on the second protrusion 81 is a rotational load. In the following description, a load clockwise in plan view (refer to arrow D in FIG. 9) acts on the second protrusion 81, for example. In the following description, the direction in which the coupler 7 is disposed with respect to the detection region 2 in the second direction Y is referred to as a lower side Y1, and the direction opposite to the lower side Y1 is referred to as an upper side Y2. The direction in which the right hand is positioned when facing the upper side Y2 with respect to the detection region 2 in the third direction Z is referred to as a right side Z1, and the side opposite to the right side Z1 is referred to as a left side.

As illustrated in FIG. 9, when a rotational load D is applied to the second protrusion 81, the second protrusion 81 rotates clockwise around a center O81 of the second protrusion 81 in plan view. Therefore, a first protrusion 61A disposed on the upper left out of the four first protrusions 61 receives such a load that the top end 62 moves to the upper side Y2 (refer to arrow D1). A first protrusion 61B disposed on the upper right out of the four first protrusions 61 receives such a load that the top end 62 moves to the right side Z1 (refer to arrow D2). A first protrusion 61C disposed on the lower right out of the four first protrusions 61 receives such a load that the top end 62 moves to the lower side Y1 (refer to arrow D3). A first protrusion 61D disposed on the lower left out of the four first protrusions 61 receives such a load that the top end 62 moves to the left side Z2 (refer to arrow D4). Thus, horizontal loads in different directions (refer to arrows D1, D2, D3, and D4) are applied in the respective four individual detection regions 4. As described above, if horizontal loads in different directions are applied in the respective four load detection regions 5, the drive IC identifies the load applied to the second protrusion 81 as a rotational load.

The following describes the advantageous effects of the load detection device 100 according to the first embodiment. In the load detection device 100 according to the present embodiment, the input surface 90 is composed of a plurality of second protrusions 91. In other words, the number of recesses and protrusions is reduced compared with the case where the input surface 90 is composed of the first protrusions 61. With this configuration, foreign matter is less likely to enter the space between the protrusions (between the second protrusions 81). In addition, the first protrusion 61 according to the present embodiment is not enlarged and has the same size as the conventional one. Therefore, easiness of the shear deformation of the first protrusion 61 is secured. Furthermore, with the present embodiment, the rotational load can be detected.

While the load detection device 100 according to the first embodiment has been described above, the load detection device according to the present disclosure may be configured such that the second protrusion 81 moves by a predetermined amount in the horizontal direction and come into contact with another second protrusion 81 disposed adjacently thereto. When the second protrusion 81 comes into contact with another second protrusion 81, the movement of the second protrusion 81 is restricted to be small. The load in the horizontal direction and the rotational direction, however, can be detected because the shear deformation occurs in the first protrusions 61. Therefore, after moving by a predetermined amount in the horizontal direction, the second protrusion 81 may come into contact with another second protrusion 81 disposed adjacently thereto. Next, other embodiments of the load detection device are described. The following mainly describes the points different from the first embodiment.

Second Embodiment

Figure 10:
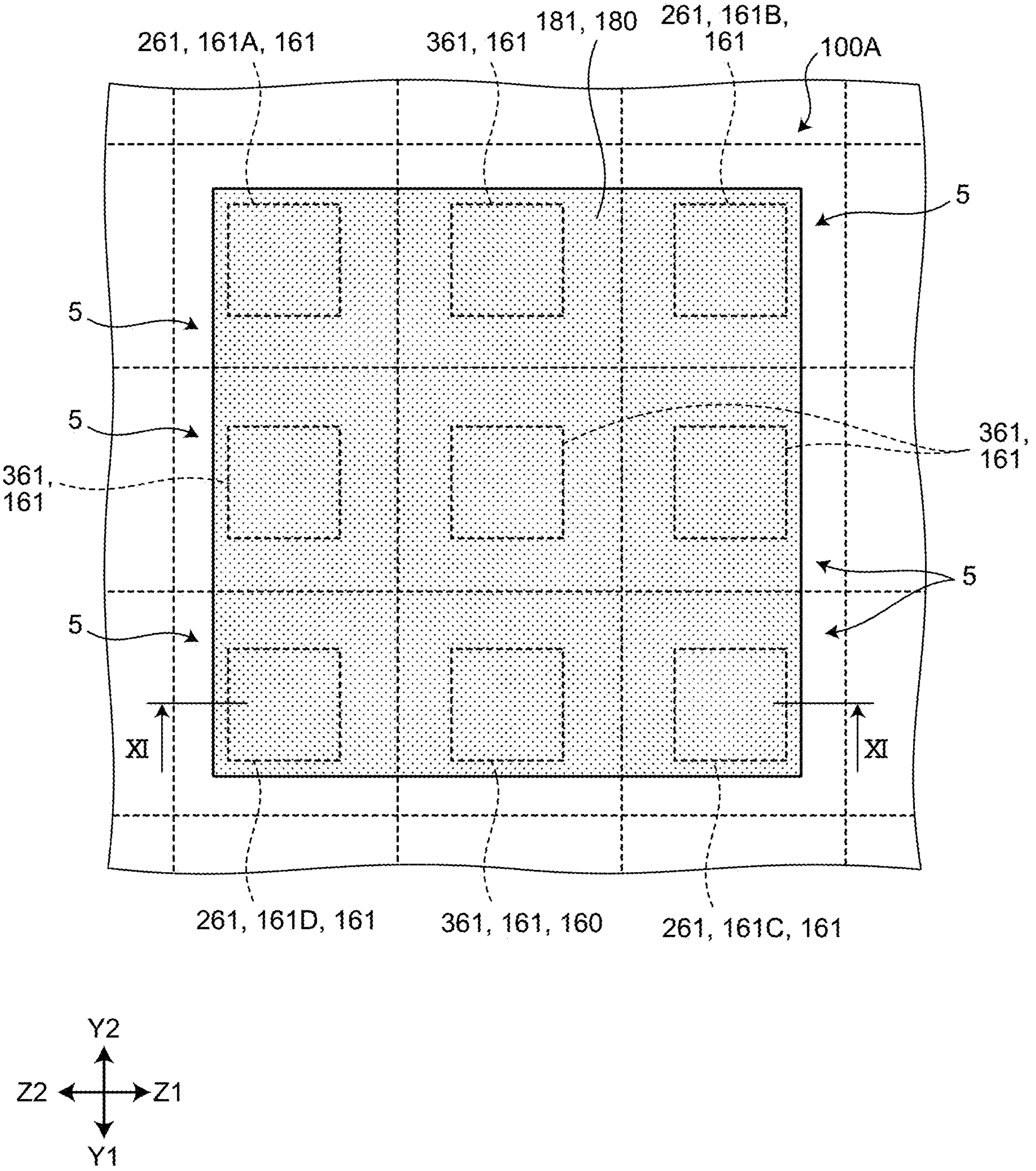
FIG. 10 is a schematic of the correspondence between the second protrusion and the first protrusions in the load detection device according to a second embodiment.
Figure 11:
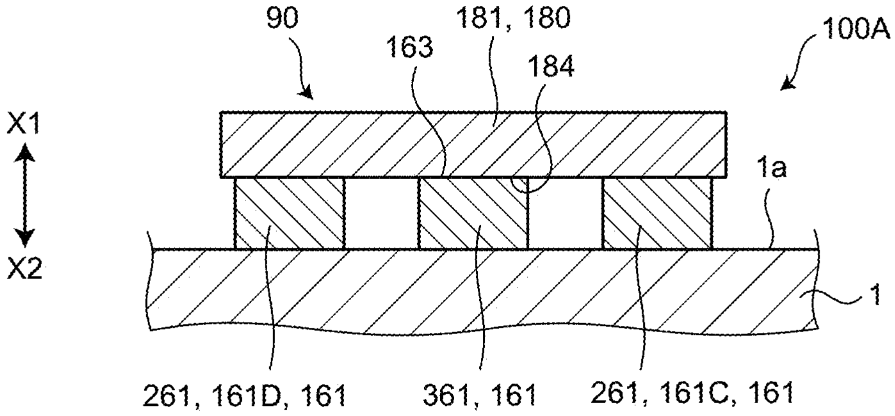
FIG. 11 is a schematic of the section along line XI-XI of FIG. 10 viewed from the arrow direction.

FIG. 10 is a schematic of the correspondence between the second protrusion and the first protrusions in the load detection device according to a second embodiment. FIG. 11 is a schematic of the section along line XI-XI of FIG. 10 viewed from the arrow direction. As illustrated in FIGS. 10 and 11, the second embodiment is different from the first embodiment in that a second protrusion 181 (input unit 180)

of a load detection device 100A according to the second embodiment is disposed to overlap a total of nine first protrusions 161 (elastic deformation part 160) in three rows in the second direction Y and three columns in the third direction Z in plan view.

Some of the nine first protrusions 161 are bonded to the second protrusion 181. More specifically, the top ends of a first protrusion 161A disposed on the upper left, a first protrusion 161B disposed on the upper right, a first protrusion 161C disposed on the lower right, and a first protrusion 161D disposed the lower left in plan view out of the nine first protrusions 161 are bonded to the second protrusion 181. In the following description, the first protrusion 161 bonded to the second protrusion 181 out of the first protrusions 161 is referred to as a bonded protrusion 261. Therefore, when the second protrusion 181 moves in the horizontal direction, the top end of the bonded protrusion 261 follows the second protrusion 181 to move in the horizontal direction. When the second protrusion 181 moves in the force direction X2, the bonded protrusion 261 receives the load in the force direction X2.

In the following description, the first protrusion 161 not bonded to the second protrusion 181 out of the first protrusions 161 is referred to as an unbonded protrusion 361. A top end surface 163 of the unbonded protrusion 361 is in contact with a bottom surface 184 of the second protrusion 181. Therefore, when the second protrusion 181 moves in the horizontal direction, the top end surface 163 of the unbonded protrusion 361 does not follow the second protrusion 181. When the second protrusion 181 moves in the force direction X2, the unbonded protrusion 361 receives the load in the force direction X2.

The following describes an exemplary operation of the load detection device according to the second embodiment. If the load acting on the second protrusion 181 is force (load in the force direction X2), the force load is transmitted from the second protrusion 181 to each of the nine first protrusions 161. Therefore, force is detected in each of the nine load detection regions 5.

Figure 12:
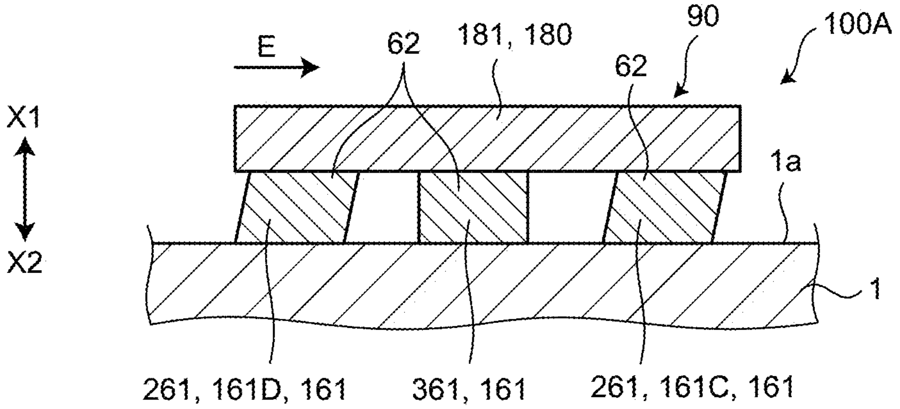
FIG. 12 is a schematic sectional view of a state where a horizontal load is applied to the second protrusion according to the second embodiment.

FIG. 12 is a schematic sectional view of a state where a horizontal load is applied to the second protrusion according to the second embodiment. As illustrated in FIG. 12, when a horizontal load E is applied to the second protrusion 181, the second protrusion 181 moves in the direction of the horizontal load E. As a result, the top ends of the bonded protrusions 261 move in the direction of the horizontal load E, and the bonded protrusions 261 are subjected to shear deformation. Therefore, the horizontal load E is detected in each of the load detection regions 5 to which the bonded protrusions 261 belong.

By contrast, the top ends of the unbonded protrusions 361 do not move in the direction of the horizontal load E. In other words, the unbonded protrusions 361 are not subjected to shear deformation. Therefore, no horizontal load is detected in the load detection regions 5 to which the unbonded protrusions 361 belong.

By contrast, if the load applied to the second protrusion 181 includes both a load in the force direction X2 and a horizontal load, the second protrusion 181 moves in the force direction X2 and in the direction of the horizontal load. Therefore, the unbonded protrusions 361 are pressed in the force direction X2 by the second protrusion 181. The load in the force direction X2 is detected in each of the load detection regions 5 to which the unbonded protrusions 361 belong. As the second protrusion 181 moves in the horizontal direction, the top ends of the bonded protrusions 261 move in the direction of the horizontal load. The bonded protrusions 261 are subjected to shear deformation, and the horizontal load is detected in each of the load detection regions 5 to which the bonded protrusions 261 belong.

Figure 13:
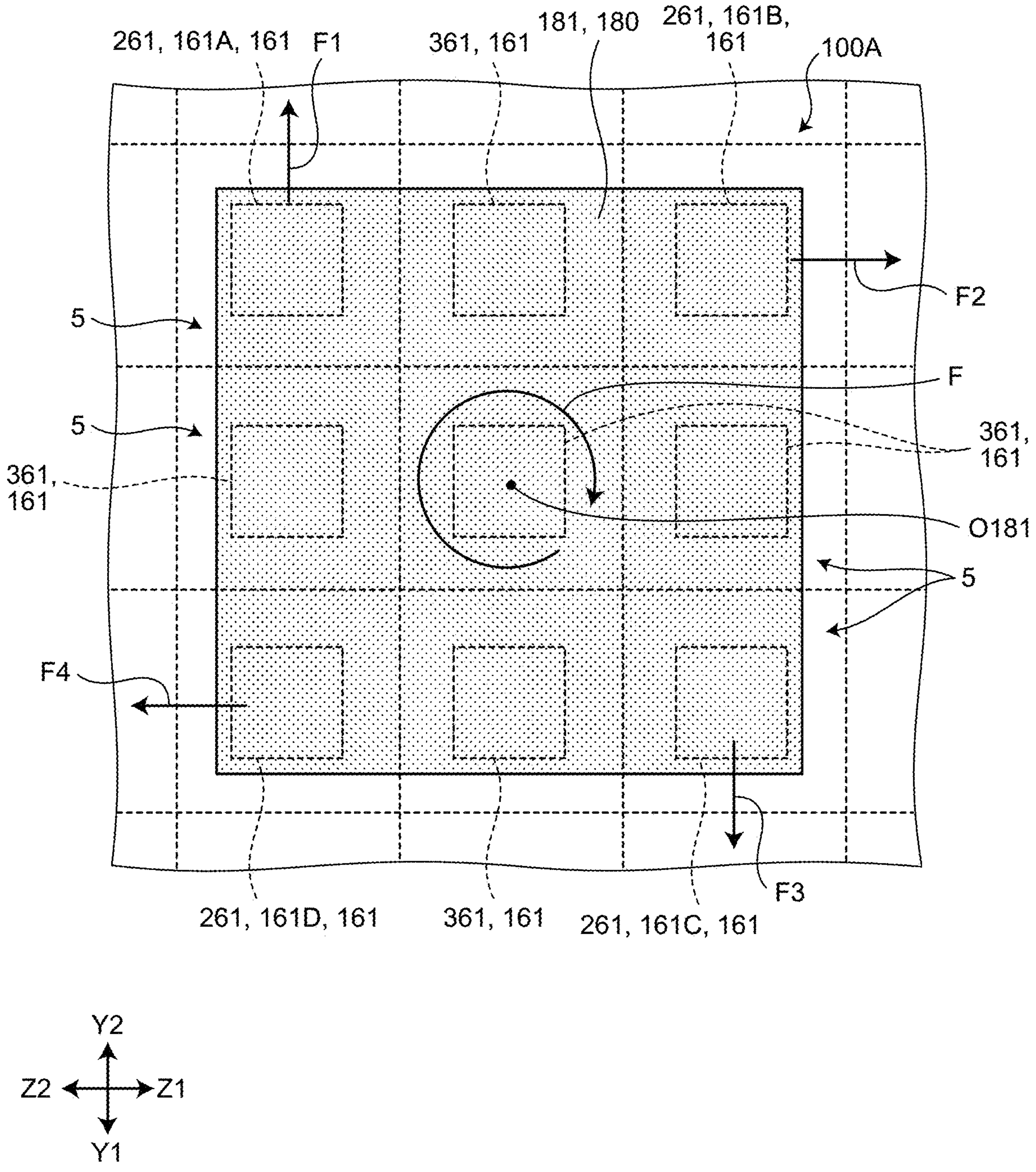
FIG. 13 is a schematic plan view of a state where a rotational load is applied to the second protrusion according to the second embodiment.

FIG. 13 is a schematic plan view of a state where a rotational load is applied to the second protrusion according to the second embodiment. As illustrated in FIG. 13, when a rotational load F clockwise around a center O181 of the second protrusion 181 acts on the second protrusion 181, the second protrusion 181 rotates clockwise around the center O181. As a result, the bonded protrusions 261 are subjected to shear deformation. More specifically, the first protrusion 161A receives such a load that the top end moves to the upper side Y2 (refer to arrow F1). The first protrusion 161B receives such a load that the top end moves to the right side Z1 (refer to arrow F2). The first protrusion 161C receives such a load that the top end moves to the lower side Y1 (refer to arrow F3). The first protrusion 161D receives such a load that the top end moves to the left side Z2 (refer to arrow F4). Therefore, horizontal loads in different directions are detected in the respective load detection regions 5 to which the four bonded protrusions 261 belong.

If the load applied to the second protrusion 181 is the rotational load F, the unbonded protrusions 361 are not pressed by the second protrusion 181. Therefore, no load is detected in the load detection regions 5 to which the unbonded protrusions 361 belong. By contrast, if the load applied to the second protrusion 181 includes not only the rotational load F but also a load in the force direction X2, the unbonded protrusions 361 receive the load in the force direction X2 from the second protrusion 181. Therefore, force is detected in each of the load detection regions 5 to which the unbonded protrusions 361 belong.

As described above, when a horizontal load and a rotational load are detected, the second embodiment can also detect force (load in the force direction X2) included in the horizontal load and the rotational load.

While the first and the second embodiments have been described above, the present disclosure is not limited to those described above. For example, while the input unit according to the present embodiment is composed only of the second protrusions, the input unit may include not only the second protrusions but also a plurality of third protrusions positioned in the first direction with respect to the second protrusions and disposed over a plurality of second protrusions. In other words, the number of stages of the protrusions stacked in the stacking direction in the input unit simply needs to be at least one or more.

While the second protrusion according to the embodiment is a quadrangular prism, it may be a polygonal prism or a cylinder, and the shape of the second protrusion is not particularly limited.

While one first protrusion 61 according to the embodiment overlaps four individual detection regions 4, it may be disposed to overlap a total of nine individual detection regions 4 arrayed in three rows in the second direction Y and three columns in the third direction Z. Thus, the number of individual detection regions 4 overlapping one first protrusion 61 in plan view is not particularly limited in the present disclosure.

While a gap is formed between the first protrusions, the gap according to the present disclosure may be filled with a certain material. The material filling the gap, however, preferably has low rigidity to facilitate deformation of the protrusions (protruding portions).

While the array electrode 20 and the common electrode 40 according to the embodiments face each other with the sensor layer 30 interposed therebetween, the present disclosure is not limited thereto. The following describes first and second modifications that employ other arrangement examples.

First Modification

Figure 14:
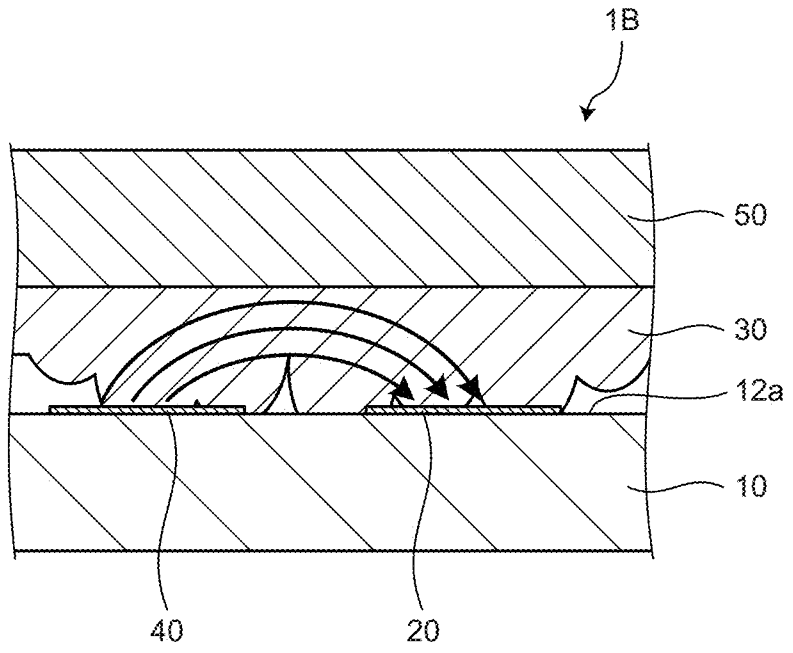
FIG. 14 is a sectional view of a force detector according to a first modification taken along a stacking direction.

FIG. 14 is a sectional view of the force detector according to the first modification taken along the stacking direction. The array electrode 20 and the common electrode 40 of a force detector 1B according to the first modification are disposed on the first surface 12*a* of the array substrate 10. Therefore, the array electrode 20 and the common electrode 40 are disposed in the horizontal direction. When force is applied, the sensor layer 30 comes into contact with the array electrode 20 and the common electrode 40, and a current flows from the common electrode 40 to the array electrode 20.

Second Modification

Figure 15:
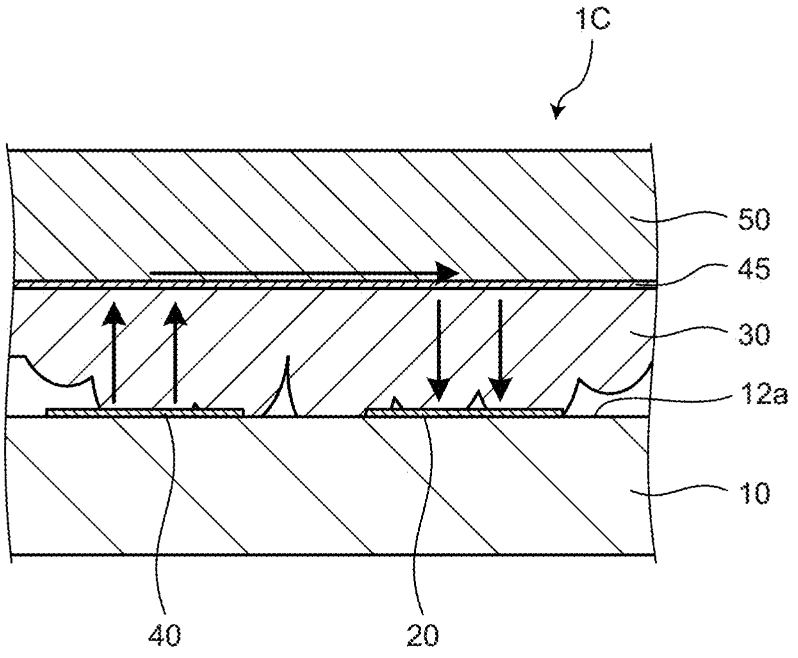
FIG. 15 is a sectional view of the force detector according to a second modification taken along the stacking direction.

FIG. 15 is a sectional view of the force detector according to the second modification taken along the stacking direction. A force detector 1C according to the second modification includes the array electrode 20, the common electrode 40, and an intermediate electrode 45. Similarly to the first modification, the array electrode 20 and the common electrode 40 are disposed on the first surface 12*a* of the array substrate 10. The intermediate electrode 45 is disposed between the sensor layer 30 and the protective layer 50. When force is applied, the sensor layer 30 comes into contact with the array electrode 20 and the common electrode 40. With this configuration, a current flows from the common electrode 40 to the intermediate electrode 45 and then flows from the intermediate electrode 45 to the array electrode 20.

While the sensor layer 30 according to the embodiments is made of conductive resin with the protrusions 30*a* on the surface in the force direction X2, the present disclosure is not limited thereto. The following describes third and fourth modifications that employ other sensor layers.

Third Modification

Figure 16:
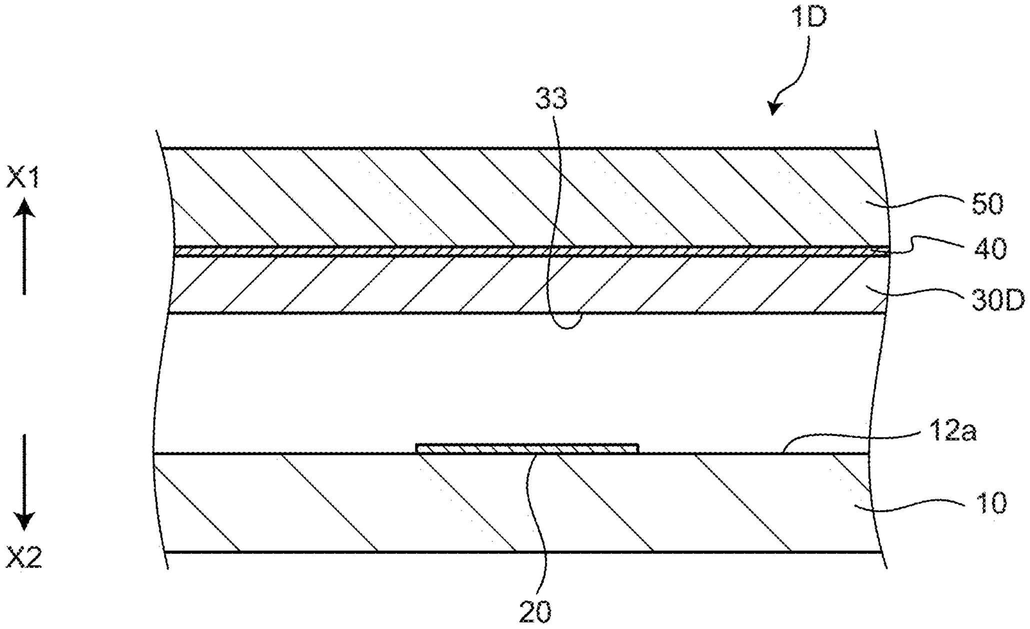
FIG. 16 is a sectional view of the force detector according to a third modification before force is applied taken along the stacking direction.
Figure 17:
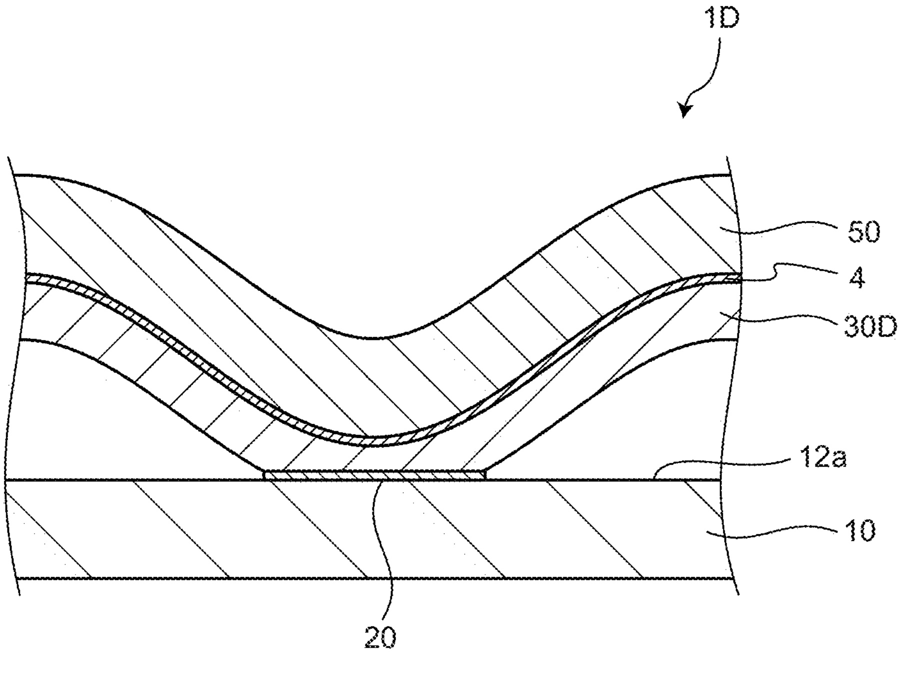
FIG. 17 is a sectional view of the force detector according to the third modification after force is applied taken along the stacking direction.

FIG. 16 is a sectional view of the force detector according to the third modification before force is applied taken along the stacking direction. FIG. 17 is a sectional view of the force detector according to the third modification after force is applied taken along the stacking direction. As illustrated in FIG. 16, a sensor layer 30D of a force detector 1D according to the third modification is made of conductive resin. A surface 33 of the sensor layer 30D in the force direction X2 is flat in the horizontal direction and is not in contact with the array electrode 20.

Figure 18:
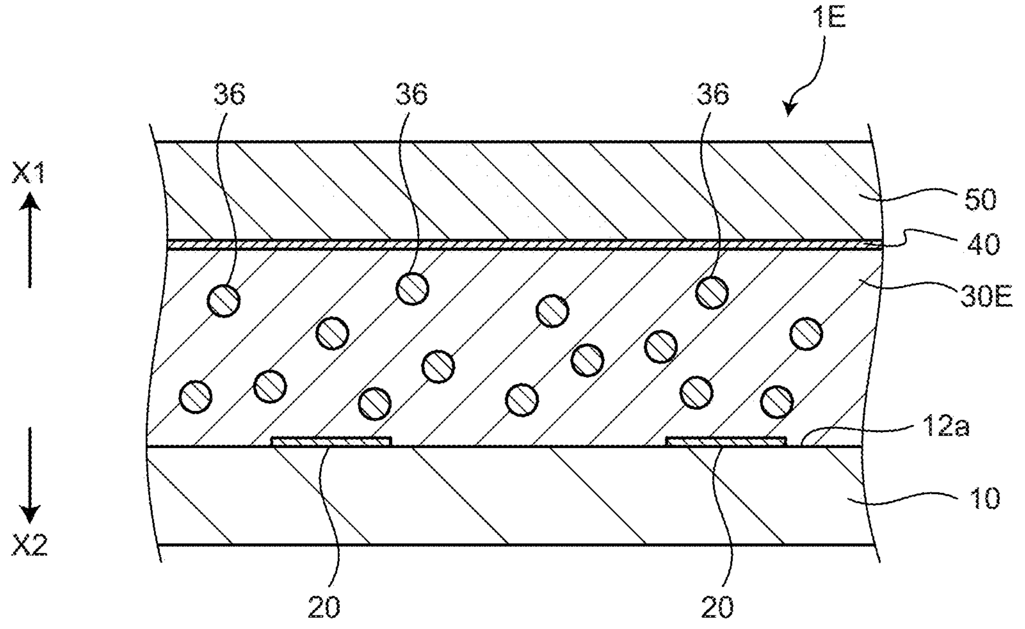
FIG. 18 is a sectional view of the force detector according to a fourth modification before force is applied taken along the stacking direction.

As illustrated in FIG. 18, when force is applied, the sensor layer 30D moves in the force direction X2 and comes into contact with the array electrode 20. As a result, a current flows from the common electrode 40 to the array electrode 20. As the force increases, the contact area between the sensor layer 30D and the array electrode 20 increases. Therefore, the amount of current flowing from the common electrode 40 to the array electrode 20 increases.

Fourth Modification

FIG. 18 is a sectional view of the force detector according to the fourth modification before force is applied taken along the stacking direction. As illustrated in FIG. 18, a sensor layer 30E of a force detector 1E according to the fourth modification includes conductive particles 36 inside insulating resin. The surface of the sensor layer 30E in the force direction X2 is in contact with the array electrode 20 and the first surface 12*a* of the array substrate 10.

When no force acts on the sensor layer 30E, that is, when the sensor layer 30E is not deformed, the particles 36 are separated and insulated. When force acts on the sensor layer 30E, the particles 36 come into contact with each other. As a result, the resistance of the sensor layer 30E decreases, and the common electrode 40 and the array electrode 20 are electrically coupled. Therefore, a current flows from the common electrode 40 to the array electrode 20. As the force increases, the number of particles 36 in contact with each other increases, and the resistance of the sensor layer 30E further decreases. As a result, the amount of current flowing from the common electrode 40 to the array electrode 20 also increases.

The lengths of the second protrusion in the stacking direction are not necessarily equal. In other words, the lengths of the protrusion and the protruding portion in the stacking direction may be appropriately changed. All the protrusions and the protruding portions are not necessarily made of the same material. In other words, protrusions (or protruding portions) made of different materials may be provided together. The top end surface of the second protrusion according to the present disclosure is not limited to a flat surface. The top end surface may have a recessed or protruding shape to increase the coefficient of friction, and the shape is not particularly limited.

What is claimed is:

1. A load detection device comprising:

a force detector, an elastic deformation part, and an input unit disposed in order in a first direction, wherein the force detector includes an array substrate provided with a plurality of array electrodes on a first surface, the first surface facing the first direction, and a sensor layer facing the array electrodes, the array electrodes are arrayed in a second direction intersecting the first direction and in a third direction intersecting both the first direction and the second direction, the elastic deformation part includes a plurality of first protrusions arrayed in the second direction and the third direction, the first protrusions are each disposed to overlap, when viewed from the first direction, at least two or more of the array electrodes arrayed in the second direction and at least two or more of the array electrodes arrayed in the third direction, the input unit includes a plurality of second protrusions arrayed in the second direction and the third direction, the second protrusions are each disposed to overlap, when viewed from the first direction, at least two or more of the first protrusions arrayed in the second direction and at least two or more of the first protrusions arrayed in the third direction, and the second protrusions arrayed in the second direction and the third direction are spaced apart from each other, the second protrusions each having a shape of a quadrangular prism.

2. The load detection device according to claim 1, wherein the second protrusions are each disposed to overlap, when viewed from the first direction, at least three or more of the first protrusions arrayed in the second direction and at least three or more of the first protrusions arrayed in the third direction, and when viewed from the first direction, some of at least nine or more of the first protrusions overlapping one second protrusion have an end in the first direction bonded to the second protrusion, and others have an end in the first direction unbonded to the second protrusion.

3. The load detection device according to claim 1, wherein the second protrusion is more rigid than the first protrusion.

* * * * *